March 6, 1928. 1,661,883
E. D. DICKINSON
ELECTRIC SHIP PROPULSION INSTALLATION
Filed July 19, 1922
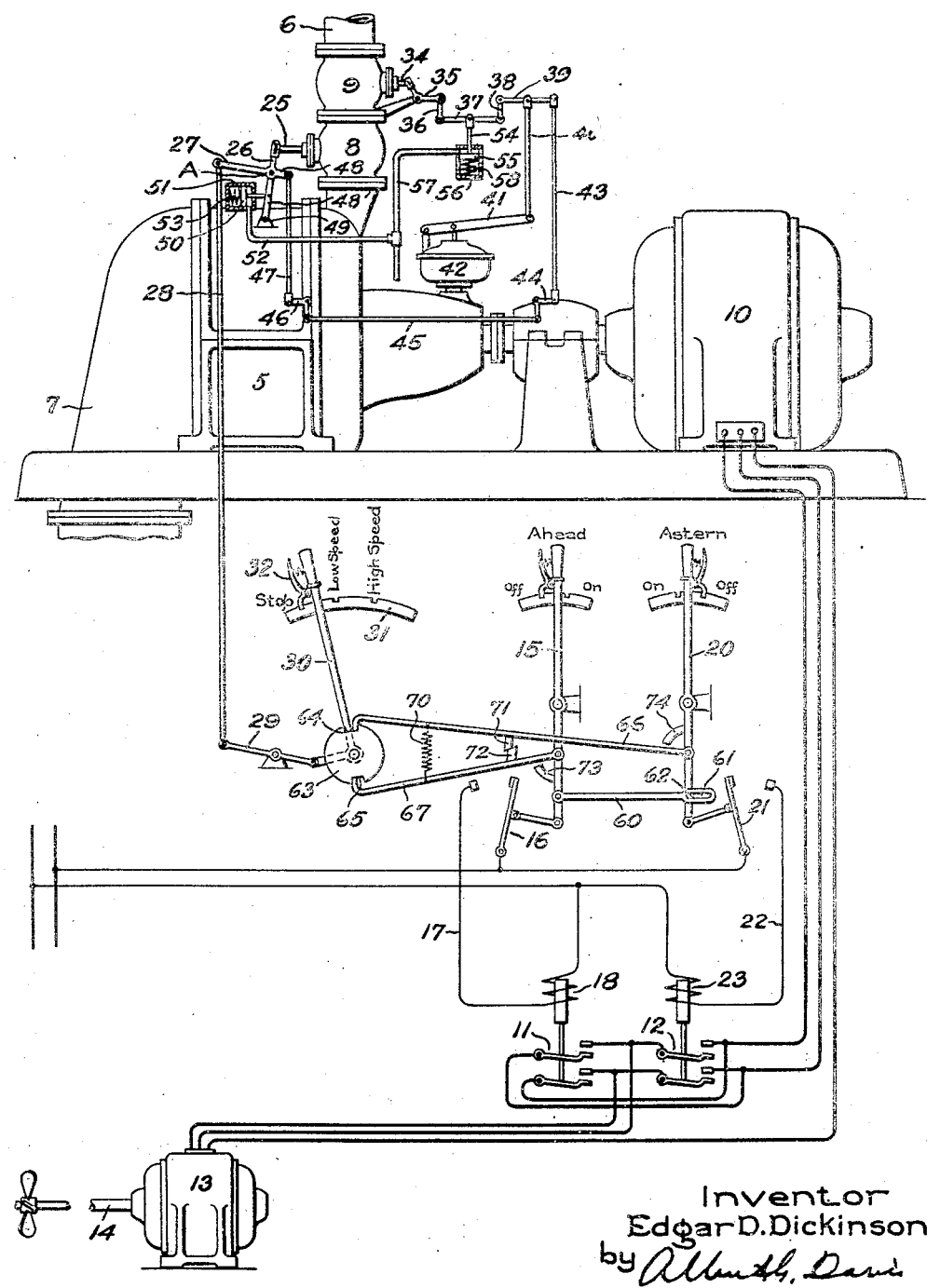
Inventor
Edgar D. Dickinson,
by Albert G. Davis
His Attorney Patented Mar. 6, 1928.

1,661,883

UNITED STATES PATENT OFFICE.

EDGAR D. DICKINSON, OF LYNN, MASSACHUSETTS, ASSIGNOR TO GENERAL ELECTRIC COMPANY, A CORPORATION OF NEW YORK.

ELECTRIC-SHIP-PROPULSION INSTALLATION.

Application filed July 19, 1922. Serial No. 576,165.

The present invention relates to electric ship propulsion installations wherein a prime mover drives a generator which in turn supplies electrical energy to a motor or motors on the propeller shaft or shafts of the ship, and has for its object to provide an improved controlling mechanism for such an installation.

For a consideration of what I believe to be novel and my invention, attention is directed to the accompanying specification and the claims appended thereto.

In the drawing, the figure is diagrammatic view of installation embodying my invention.

Referring to the drawing, 5 indicates a prime mover, such as an elastic fluid turbine, having an inlet conduit 6 and an exhaust conduit 7. In inlet conduit 6 is a hand controlled throttle valve 8 and a governor controlled throttle valve 9 arranged in series relation to each other. Prime mover 5 is directly coupled to an electric generator 10 which in turn is connected through an ahead switch 11 and an astern switch 12 to a motor 13 which drives a propeller shaft 14. As is well understood when ahead switch 11 is closed motor 13 will be operated in a direction to propel the ship forward and when astern switch 12 is closed motor 13 will be operated in a direction to propel the ship backward. Ahead switch 11 is controlled by a lever 15 which when moved to "on" position closes a switch 16 located in an electric circuit 17 in which is an electromagnet 18 for actuating switch 11. Astern switch 12 is controlled by a lever 20 which when moved to "on" position closes a switch 21 located in an electric circuit 22 in which is an electromagnet 23 for actuating switch 12.

Hand controlled throttle valve 8 has its stem 25 connected to arm 26 of a three-arm lever A. Arm 27 of three-arm lever A is connected by a rod 28 and a lever 29 to an operating hand lever 30. Hand lever 30 moves over a locking segment 31 and is provided with a catch 32 for fastening it in its adjusted positions. In the present instance three notches are shown in segment 31 corresponding to "stop", "low speed" and "high speed" of prime mover 5 but any number of graduations may be used as found desirable. Governor controlled valve 9 has its stem 34 connected to one arm of a bell crank lever 35, the other arm being connected by a link 36 to one end of a lever 37. The other end of lever 37 is connected by a link 38 to one end of a floating lever 39, and connected to the central portion of lever 39 is one end of a rod 40 the other end of which is connected to the governor lever 41 of a speed governor 42. The other end of floating lever 39 is connected by a rod 43, bell crank lever 44, rod 45, bell crank lever 46, and rod 47 to the third arm 48 of lever A. By this arrangement when hand lever 30 is operated to regulate the setting of valve 8 it will at the same time through the intermediary of the connection between lever arm 48 and floating lever 39 effect a corresponding setting of governor 42 so that by means of hand lever 30 the governor is set automatically for the speed for which valve 8 is set.

Valves 9 and 8 are also so arranged that in case the supply of lubricant to the bearings of the installation fails the valves will be automatically closed. To this end I support the three-arm lever A on the end of an arm 48' pivotally supported at 49 and connected to arm 48' is the stem of a movable abutment 50 which is subjected to the lubricant pressure. In the present instance movable abutment 50 is shown as comprising a piston moving in a cylinder 51 and subjected on one side to the pressure of the lubricant supply systems through a pipe 52, and on the other side to the pressure of a spring 53. With this arrangement, as long as the pressure of the lubricant supply system is maintanied, abutment 50 will be held stationary against the action of the spring 53 and will hold arm 48 stationary. In case the lubricant pressure fails, then spring 53 will move abutment 50 and arm 48 in a direction to close valve 8. An arrangement of a similar character is provided in connection with valve 9. In this case, lever 37 is fulcrumed on the end of stem 54 connected to a piston 55 which moves in a cylinder 56. On one side, piston 55 is subjected to the pressure of the lubricating system through a pipe 57 and on the other side it is subjected to the pressure of a spring 58. As is obvious, in case the pressure above piston 55 fails, spring 58 will move piston 55 to close valve 9.

With a system as above described, it is important that the controlling levers 15, 20 and 30 for the motor and prime mover be moved always in a certain sequence and to insure this I provide an interlocking arrangement among these levers of such a nature that the operator, in operating the installation can make no mistake of a nature likely to injure the apparatus. To this end I interlock levers 15 and 20 by means of a link 60 which at one end is pivoted to lever 15 and at the other end is provided with a slot 61 in which is a pin 62 carried by lever 20. With this arrangement either lever 15 or lever 20 may be thrown to "on" position but both cannot be put in "on" position at the same time. I then interlock both levers 15 and 20 with lever 30 in such manner that neither lever 15 nor 20 can be operated to close its switch until the prime mover is started. On the other hand, the arrangement is such that the prime mover can be operated only at low speed until after either switch 11 or 12 is closed. In other words, the arrangement is such that the operator must first start the prime mover, then close the circuit on the propelling motor, and then increase the speed of the prime mover. To accomplish this purpose, I provide on the shaft, on which lever 30 turns, a disc 63 in which are two notches 64 and 65. Connected to lever 20 is a rod 66 having at its free end a nose which rests in notch 64 and connected to lever 15 is a rod 67 having at its free end a nose which rests in notch 65. As is obvious from an inspection of the drawing, when lever 30 is in "stop" position as shown neither switch lever 15 nor 20 can be moved to "on" position to close its switch. Lever 30, however, may be moved to low speed position to start the prime mover but it can be moved no further on account of the noses on rods 66 and 67 which rest in notches 64 and 65. Rods 66 and 67 are connected together by a spring 70 and they are provided with projections 71 and 72 having beveled ends which engage each other. On lever 15 just below rod 67 is a curved arm 73 and on lever 20 just above rod 66 is a curved arm 74.

In operation, hand lever 30 is first moved from "stop" position to "low speed" position to start the turbine. This releases levers 15 and 20 so that either may now be moved to start the motor. Assuming that it is desired to propel the ship forward, ahead lever 15 is thrown to "on" position to close switch 16 which effects the closing of switch 11. Astern lever 20 is then locked against movement by link 60. When lever 15 is thrown to "on" position the nose on the end of rod 67 slides forward in notch 65 and at the same time projection 72 slides under projection 71 to lift the nose on the end of rod 66 out of notch 64, rod 67 being held from outward movement by curved arm 73. This then releases disc 63 so that control lever 30 may be moved toward high speed position at will. However, the motor circuit cannot be opened until control lever 30 is returned to low speed position. If it is desired to reverse the ship, control lever 30 is moved to low speed position, after which lever 15 is moved to "off" position. This opens motor switch 11 and releases control lever 20 which can then be thrown to "on" position. When this is done, control lever 15 will be locked against movement and the end of rod 67 will be forced out of notch 65 by projection 71 sliding over projection 72, curved arm 74 acting to prevent outward movement of rod 66. This then releases control lever 30 so it may again be moved to increase the speed of the turbine.

Suitable means may be provided for controlling the excitation circuit of the generator and such means will preferably be interlocked with the controlling mechanism so that the reversing switches cannot be operated until the excitation has been removed from the generator, but since such interlocking is old and well known and forms no part of my invention it is not illustrated.

What I claim as new and desire to secure by Letters Patent of the United States, is:—

In a ship propulsion system, the combination of a prime mover, a generator driven thereby, a motor, switch means for connecting the generator to the motor whereby the motor may be connected to operate in either direction, a controlling means for the switch means, valve mechanism for controlling the admission of elastic fluid to said prime mover, a manually controlled means for said valve mechanism, a governor means also connected with said valve mechanism, means connecting said manual controlling means to said governor means for modifying the setting of it in accordance with the position of said manually controlled means, and interlocking means between said switch controlling means and said manually controlled means whereby the prime mover must be started before said switch means can be closed and said switch means must be closed before the prime mover can be operated above a predetermined low speed.

In witness whereof, I have hereunto set my hand this 14th day of July, 1922.

EDGAR D. DICKINSON.